United States Patent
Chen et al.

(10) Patent No.: US 10,712,795 B2
(45) Date of Patent: Jul. 14, 2020

(54) POWER SUPPLY UNIT FAN RECOVERY PROCESS

(71) Applicant: QUANTA COMPUTER INC., Taoyuan (TW)

(72) Inventors: Chao-Jung Chen, Taoyuan (TW); Yi-Chieh Chen, Taoyuan (TW); Yueh-Chang Wu, Taoyuan (TW); Ching-Yi Shih, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 230 days.

(21) Appl. No.: 16/047,382

(22) Filed: Jul. 27, 2018

(65) Prior Publication Data

US 2019/0235597 A1 Aug. 1, 2019

Related U.S. Application Data

(60) Provisional application No. 62/623,694, filed on Jan. 30, 2018.

(51) Int. Cl.
*G06F 1/28* (2006.01)
*G06F 11/07* (2006.01)
(Continued)

(52) U.S. Cl.
CPC ............ *G06F 1/28* (2013.01); *G06F 11/0751* (2013.01); *G06F 11/0793* (2013.01); *G06F 11/2015* (2013.01); *G06F 11/3003* (2013.01)

(58) Field of Classification Search
CPC .... G06F 1/28; G06F 11/0751; G06F 11/0793; G06F 11/2015; G06F 11/3003
See application file for complete search history.

(56) References Cited

U.S. PATENT DOCUMENTS

| 5,848,230 A | * | 12/1998 | Walker | ................ G06F 11/2058 |
| | | | | 714/6.32 |
| 2002/0042896 A1 | * | 4/2002 | Johnson | ................ G06F 13/385 |
| | | | | 714/47.2 |

(Continued)

FOREIGN PATENT DOCUMENTS

| CN | 107122035 A | 9/2017 |
| CN | 107394789 A | 11/2017 |

(Continued)

OTHER PUBLICATIONS

EPO Search Report & Opinion for Application No. EP 18211717, dated Oct. 25, 2019, pp. 1-8 (Year: 2019).*

(Continued)

*Primary Examiner* — Matthew M Kim
*Assistant Examiner* — Indranil Chowdhury

(57) ABSTRACT

Systems and methods are provided for controlling two or more PSUs of a server system. An exemplary method comprises first determining whether the PSUs are switched on to an AC power source. If the PSUs are found not switched on to an AC power source, the method further comprises restarting the AC power source for the PSUs and completing a software-based recovery process. If the PSUs are found to be switched on to an AC power source, the method further comprises determining whether the PSUs meet a predefined criterion. If the PSUs do meet a predefined criterion, the method further comprises disabling a cold-redundancy mode for the PSUs. If the PSUs do not meet a predefined criterion, the method further comprises starting a wake-up process for a first PSU from a cold-redundancy mode.

11 Claims, 7 Drawing Sheets

(51) Int. Cl.
G06F 11/20 (2006.01)
G06F 11/30 (2006.01)

(56) References Cited

U.S. PATENT DOCUMENTS

| | | | | |
|---|---|---|---|---|
| 2002/0101714 | A1* | 8/2002 | Osecky | H05K 7/20836 |
| | | | | 361/679.48 |
| 2003/0193307 | A1 | 10/2003 | Burstein | |
| 2011/0227521 | A1* | 9/2011 | Lu | G06F 11/0793 |
| | | | | 318/400.21 |
| 2012/0069514 | A1* | 3/2012 | Ross | H05K 7/20718 |
| | | | | 361/679.33 |
| 2016/0320818 | A1* | 11/2016 | Huang | G06F 11/30 |
| 2017/0104438 | A1 | 4/2017 | Chu | |
| 2017/0168535 | A1* | 6/2017 | Ragupathi | G06F 1/28 |
| 2018/0203499 | A1* | 7/2018 | Huang | G06F 11/2015 |

FOREIGN PATENT DOCUMENTS

| | | |
|---|---|---|
| TW | 201419747 A | 5/2014 |
| TW | 201720000 A | 6/2017 |

OTHER PUBLICATIONS

TW Office Action for Application No. 107138455, dated Sep. 3, 2019, w/ First Office Action Summary.
TW Search Report for Application No. 107138455, dated Sep. 3, 2019, w/ First Office Action.

\* cited by examiner

POWER SUPPLY UNIT FAN RECOVERY PROCESS

CROSS-REFERENCE TO RELATED APPLICATIONS

This application claims priority to and the benefit of U.S. Provisional Patent Application No. 62/623,694, entitled "PSU CONTROL MECHANISM TO PREVENT AIR CIRCULATION" and filed Jan. 30, 2018, the contents of which are incorporated by reference in their entirety as if fully set forth herein.

FIELD

The present invention relates to controlling operation of a power supply unit, and more specifically, to systems and methods for adjusting operation of a power supply unit which is not meeting the needs of a computer system.

BACKGROUND

Computer systems typically include a large number of computer components. The components need to be working properly in order to ensure the successful, continuous operation of the computer system. Power supply units (PSUs) have unique roles in computer systems because PSUs provide power and also include an attached cooling fan to circulate air over heat-producing components in the computer system. Although the PSU's cooling fan is typically weaker than other fans in the computer system, but the PSU's cooling fan can still provide crucial cooling. For example, in some computer systems, the failure of a PSU or the PSU's fan has been known to cause damage due to overheating. Therefore, it is extremely important to the functionality of a computing system that a PSU is quickly restored to operation (particularly its fan) if it fails to function properly.

The placement of a PSU can affect the ability to restore functionality of the PSU. For example, in a first typical configuration, the PSU and its fan can be placed along the exterior edge of the computer system while stronger system fans are placed in front of or behind the PSU fan. In second typical configuration, the PSU and its fan can be placed in parallel with the stronger system fans. The second configuration can be problematic for PSU fans because the stronger system fans can cause a reverse air current through the weaker PSU fans. For example, if the PSU fan is operating at less than full capacity or fails for any reason, air can be pulled between the blades of the PSU fan and pulled through the input of the stronger fan. This can cause the weaker PSU fan to slow down, cease operating, fail to restart, and even rotate in the incorrect direction.

Although the first configuration can be implemented in many computer systems, other computer systems can require the second configuration due to space, shape, sizing, and wiring restrictions for the computer components in such computer systems.

In view of the foregoing, systems and methods are needed to detect when a PSU in a computer system is not operating properly and to enable the PSU to return to normal operation, i.e., so that that a cooling fan in the PSU can return to having an adequate operating speed and providing a correct airflow direction.

SUMMARY

The various examples of the present disclosure are directed towards a computer-implemented method for controlling two or more PSUs of a server system. An exemplary method, according to an embodiment of the present disclosure, runs through a series of steps to check whether a PSU is functioning properly, and then restores proper functionality according to the system's requirements if the PSU is found to be not functioning properly. In one embodiment, the method comprises first determining whether the two or more PSUs are switched on to an AC power source. If the two or more PSUs are found not switched on to an AC power source, the method further comprises restarting the AC power source for the two or more PSUs and completing a software-based recovery process. If the PSUs are found to be switched on to an AC power source, the method further comprises determining whether the two or more PSUs meet a predefined criterion. If the two or more PSUs do meet a predefined criterion, the method further comprises disabling a cold-redundancy mode for the two or more PSUs. If the two or more PSUs do not meet a predefined criterion, the method further comprises starting a wake-up process for a first PSU from a cold-redundancy mode.

In one exemplary implementation, the predefined criterion can include an uncoupled state of the two or more PSUs, and at least one of the following: failure of at least one fan in the server system, and/or a temperature in the computer system that is greater than a threshold operational temperature.

In another exemplary implementation, the wake-up process can comprise uncoupling the two or more PSUs and evaluating each PSU individually to identify whether each PSU is operating properly. Determining if each PSU is operating properly can comprise identifying when both of the following conditions are met: (1) a power input to the first PSU is greater than a first amount and (2) a power output of a first PSU is equal to a second amount and then checking if the first PSU has failed. If the PSU has failed, the method can further comprise completing a software-based recovery process for the first PSU. If the first PSU has not failed, then the method can further comprise proceeding to a normal operating mode for the two or more PSUs. The first amount can be twenty-five watts. The second amount can be zero watts.

In another exemplary implementation, the software-based recovery process can comprise reducing the duty of at least one system fan to a predetermined percentage for a predetermined period of time. The method can then set a checkpoint period where the two or more PSUs cannot send a failure alert. The method can then comprise starting a power-capping function wherein power is reduced for at least one other power component of the server system. The length of the checkpoint period can be ten seconds. The predetermined percentage can be forty percent. The predetermined period of time can be ten seconds.

The words "computer system," "computing system," and "server system" are all used interchangeably in this present disclosure, and can be used to identify any electronic computing system that can use a fan to cool overheating electronic components. Such an electronic computing system can include, but not be limited to, a personal computer, a laptop computer, a tablet, and a commercial or private server system.

The words "fan" and "cooling fan" are used interchangeably in this present disclosure, and can be used to identify an electrically powered machine creating a flow of air in a preferred direction.

Reducing a fan's "duty" refers to reducing a selected speed for the fan.

Additionally, PSU fans are always attached to a corresponding PSU when described in the present disclosure.

DETAILED DESCRIPTION

Figure 1A:
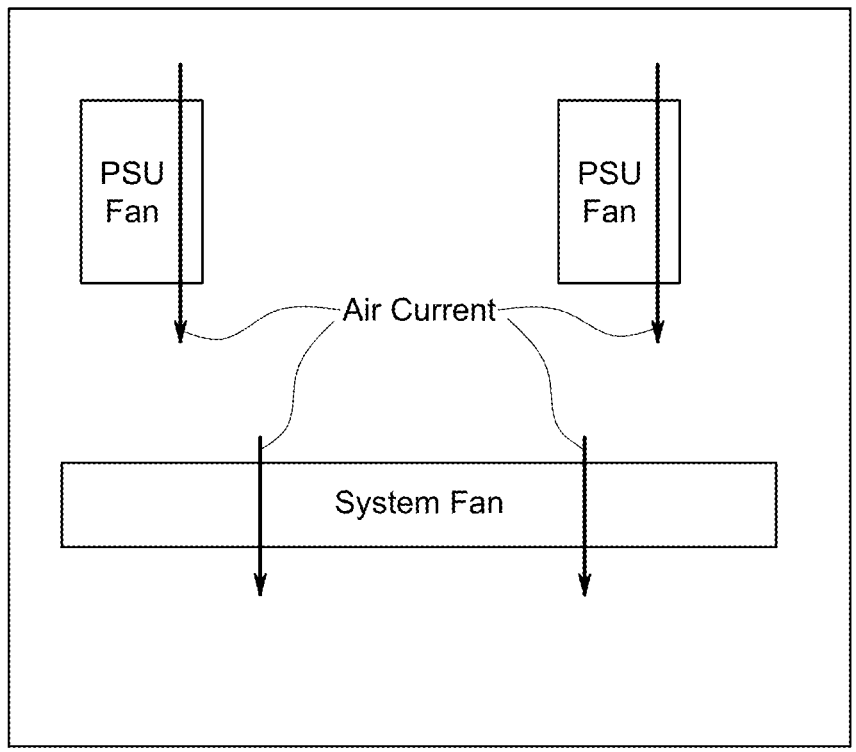
FIG. 1A shows a schematic diagram of a computing system where PSU fans are placed behind a system fan.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The present disclosure is directed to a methodology that continually monitors a computer system to enable restoration of an incorrectly operating PSU, particularly its fan. The system first checks to identify the status of the PSUs in the system. More than one PSU can be coupled together in a cold-redundancy mode to provide back-up in case one of the PSU fails. When restoring the failed PSU, the methodology also needs to take into account potential reverse airflow from stronger system fans.

Therefore, an exemplary method, according to an embodiment of the present disclosure, can first reduce the duty of the system fans to a predetermined percentage for a predetermined period of time. This reduction will solve the problem of reverse airflow into the PSU fan because the system fans will no longer generate a current so strong that it prevents the PSU fan from starting. For example, the duty of the system fans can be reduced to forty percent for ten seconds. This reduction has been tested in computer systems and shown to be an adequate reduction.

The method can additionally set a black-out window to prevent the PSU from sending out a failure notification during the black-out window. The black-out window can be a predetermined length of time during which a check is run at the beginning and end of the period to see whether the PSU has begun functioning properly again. For example, the predetermined length of time can be ten seconds. For example, an initial warning can be sent out of the PSU fan does not reach a target speed within 5 seconds. A second warning can be sent out at 15 seconds to indicate that the PSU fan has still not reached its target speed.

This method successfully restores proper functionality to a PSU through its continual monitoring of the computer system; ability to solve the problem of a reverse airflow; and reliance on accurate percentages for system fan speed reduction and power-capping for other system components. This method provides a unique solution to a failed or failing PSU through its use of a protection process which is software-based, and does not require additional hardware components. Furthermore, the suggested percentages and time periods for adjustment provide a new and efficient protocol for restoring operation to the PSU while having a minimum impact on other system components.

FIG. 1A shows a first exemplary arrangement for fans in a computer system. This arrangement shows one possible placement for PSU fans where multiple PSU fans can be found in line behind at least one system fan. FIG. 1A shows two PSU fans, but there can be any number of PSU fans, so long as there is at least one. In the arrangement of FIG. 1A, no reverse airflow occurs after a PSU failure because the larger system fan is always drawing air in the same direction as the PSU fans are designed to blow. Therefore, any air current generated from the system fan will be in the same direction as the intended direction for air current through PSU fan's. Exemplary air current paths are displaced by the arrows running through the components.

Figure 1B:
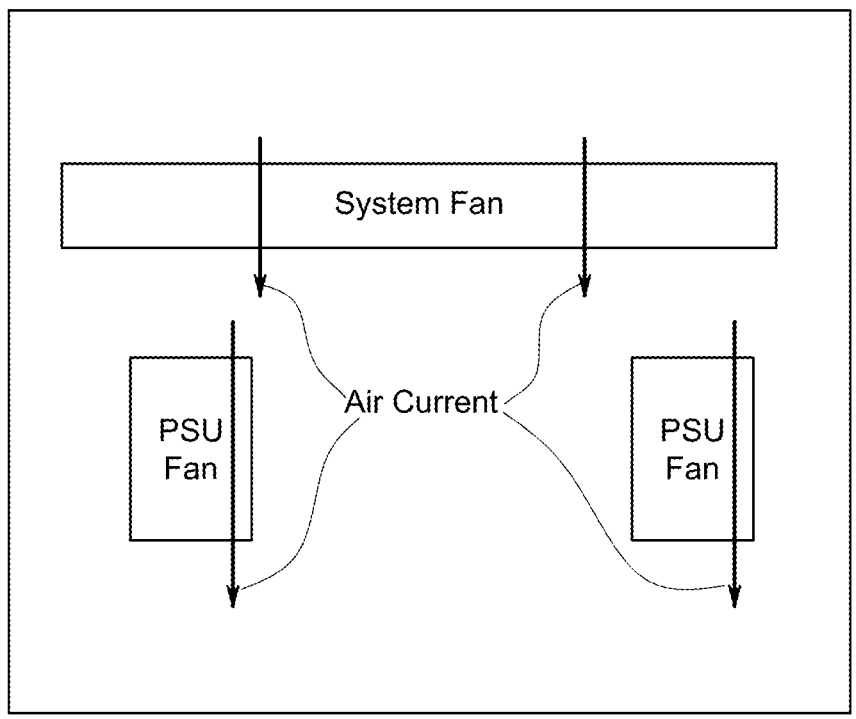
FIG. 1B shows a schematic diagram of a computing system where PSU fans are placed in front of a system fan.

FIG. 1B shows a second exemplary arrangement for fans in a computer system which would also not cause reverse airflow. In the arrangement of FIG. 1B, the PSU is placed directly in front of the system fan. In the arrangement of FIG. 1B, no reverse airflow occurs after a PSU failure because the larger system fan is always drawing air in the same direction as the PSU fans are designed to blow. Therefore, any air current generated from the system fan will be in the same direction as the intended direction for air current through PSU fan's.

Figure 2:
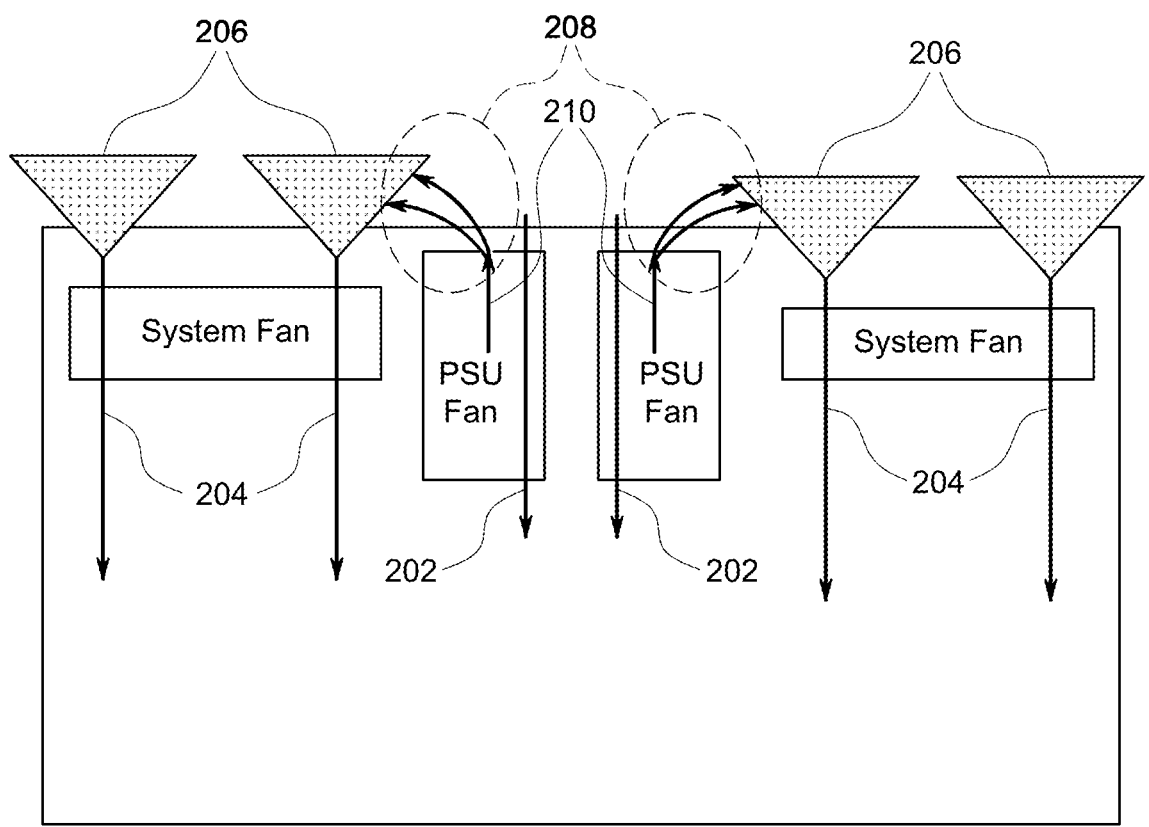
FIG. 2 shows a schematic diagram of a computing system where PSU fans are placed beside and in parallel with a system fan.

In contrast to the arrangement of FIGS. 1A and 1B, FIG. 2 shows an exemplary arrangement in a computer system where the placement of the PSU fans and the system fans can lead to a reverse airflow that can impede the performance of the PSU. In some cases, such an arrangement can even prevent the PSU from returning to proper operation. Exemplary air current paths are displaced by the arrows running through the components. In FIG. 2, arrows 202 running through the PSU fans demonstrate the proper way that air should flow through the PSU fan. Similarly, arrows 204 running through the system fans demonstrate the proper way that air should flow through the system fans.

However, when the system fans are configured as shown in FIG. 2, the system fans can pull air in from a surrounding region behind the system fan. Such system fans can pull air in from multiple directions (as indicated by hatched regions 206). As a result, if an area of a system fan is sufficiently close to an air inlet for a PSU, the system fan can pull air through the PSU (as indicated by arrows 208). Thus, a reverse air current (shown by arrows 210) can form through the PSU fan unit in response to the strong air draw from the system fan. Consequently, FIG. 2 shows the need for a solution to prevent the PSU fan from rotating in the reverse direction when PSU fans and system fans are in this configuration. In addition, if the PSU fan ever stops rotating, the PSU fan might not be able to restart operation because the reverse airflow current created by the system can be too strong for the weaker PSU fan to overcome.

Figure 3A:
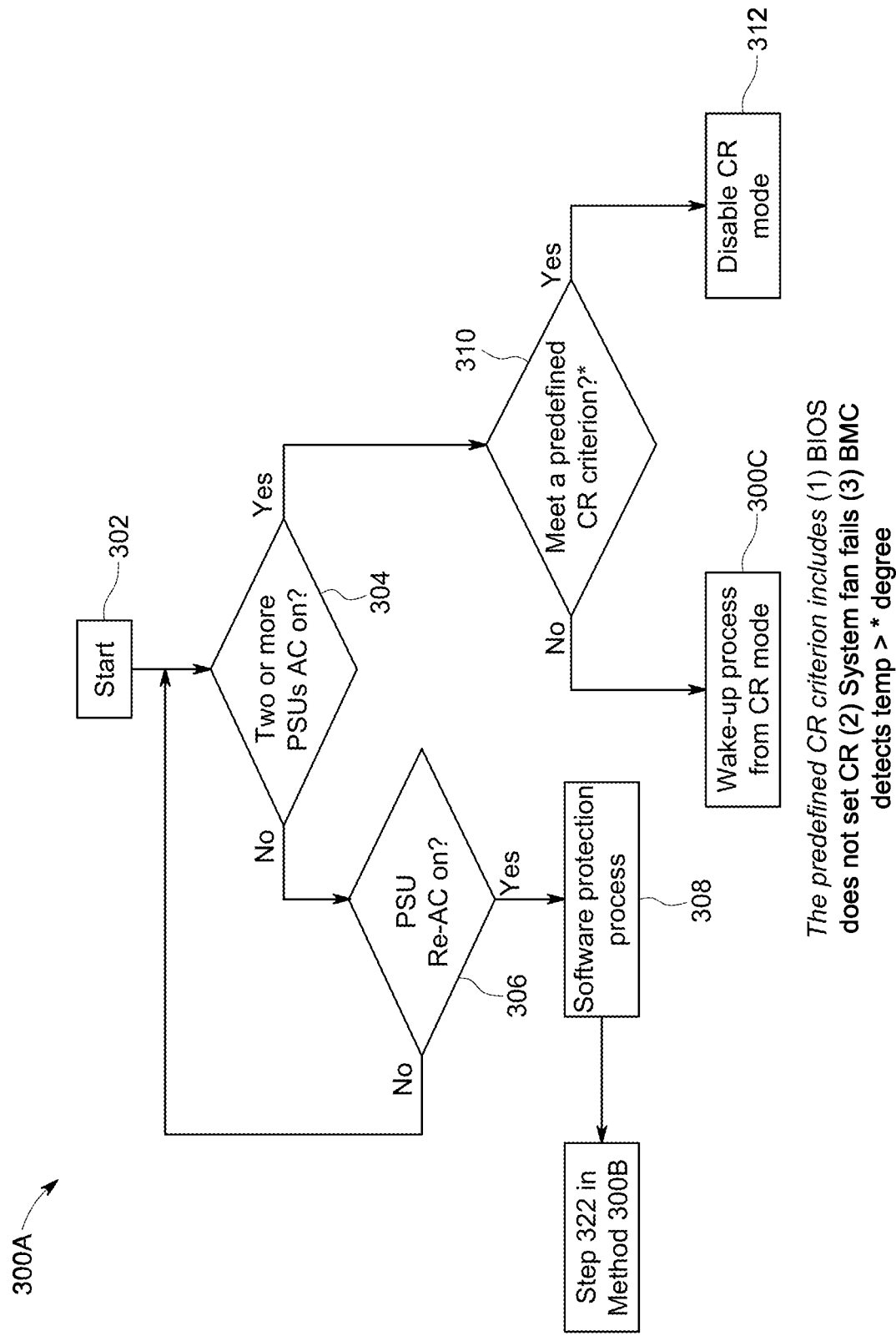
FIG. 3A is a flowchart of the methodology for controlling two or more PSUs of a server system.

FIG. 3A is an exemplary flow chart of steps for implementing a method 300A according to the present disclosure which can restart operation of a PSU that is not operating properly. In step 302, method 300A begins with a baseboard management controller (BMC) monitoring the functionality of its PSUs. In step 304, a determination is made as to whether two or more PSUs are switched onto an AC power source.

If the two or more PSUs are switched onto an AC power source, the BMC then proceeds to step 310 to check whether the PSUs meet a predefined cold-redundancy criterion. An exemplary cold-redundancy criterion can examine whether the PSUs are in an uncoupled state and whether there is failure of at least one fan in the server system, and/or a temperature in the computer system that is greater than a threshold operational temperature.

If the predefined criterion is met at step 310, then the BMC proceeds to step 312 where the cold-redundancy mode is disabled. The BMC can then return to step 302 to continue monitoring the system. The BMC will run through the methodology 300A again to ensure that the PSU is operating properly. If the predefined criterion is not met at step 310, then method 300A proceeds to method 300C where the computer system begins a wake-up process from the cold-redundancy mode. Method 300C is discussed below in more detail with respect to FIG. 3C.

This wake-up process uncouples the PSUs and proceeds to evaluate each PSU individually to see which one is not operating properly. This wake-up process is shown in FIG. 3C and begins in step 332. At step 332, a first determination is made as to whether a power input to a first PSU is greater than a first amount, and whether a power output of the first PSU is equal to a second amount. If answer to both components of the first determination is "NO", then method 300C proceeds back to step 304 in method 300A of FIG. 3A. This indicates that the PSUs are operating properly and the method then continues to monitor the PSU system.

If the first determination is true, the method 300C can proceed to a second determination which evaluates whether a power input is greater than a first amount and the power output is greater than a second amount. If answer to both components of the second determination is "NO", then method 300C proceeds back to step 304 in method 300A of FIG. 3A. This indicates that the PSUs are operating properly and the method then continues to monitor the PSU system.

However, if answer to both of these is "YES", then method 300C proceeds to step 336. In step 336, a determination is made as to whether a PSU has failed. When a PSU fails, the PSU can release an alert to the computer system to identify that the PSU has failed. An alert allows the computer system to detect a failure before the computer system overheats. If, in step 336, it is determined that a PSU has failed, method 300C proceeds method 300B, particularly step 322, in order to complete the software-based recovery process for the failed PSU. Method 300B is presented below in greater detail with respect to FIG. 3B. In contrast, if it is determined at step 336 that there are no failed PSUs, method 300C proceeds to step 340. At step 340, the method checks that the PSU has been switched from a coupled cold-redundancy mode to an uncoupled, normal operation mode. The method can then stop here or return to the beginning of method 300A in FIG. 3A to continue monitoring the computer system.

Figure 3B:
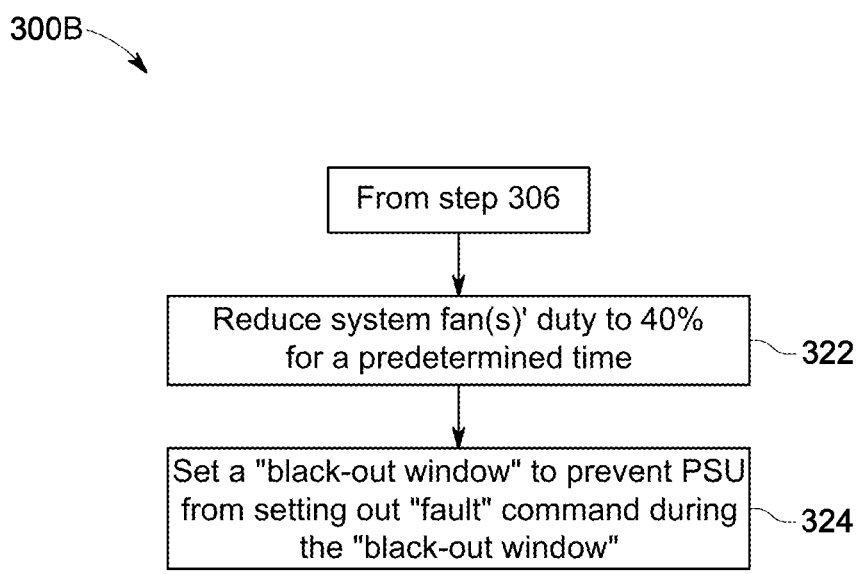
FIG. 3B is a flowchart of the methodology for an exemplary software-based recovery process according to an embodiment of the present disclosure.
Figure 3C:
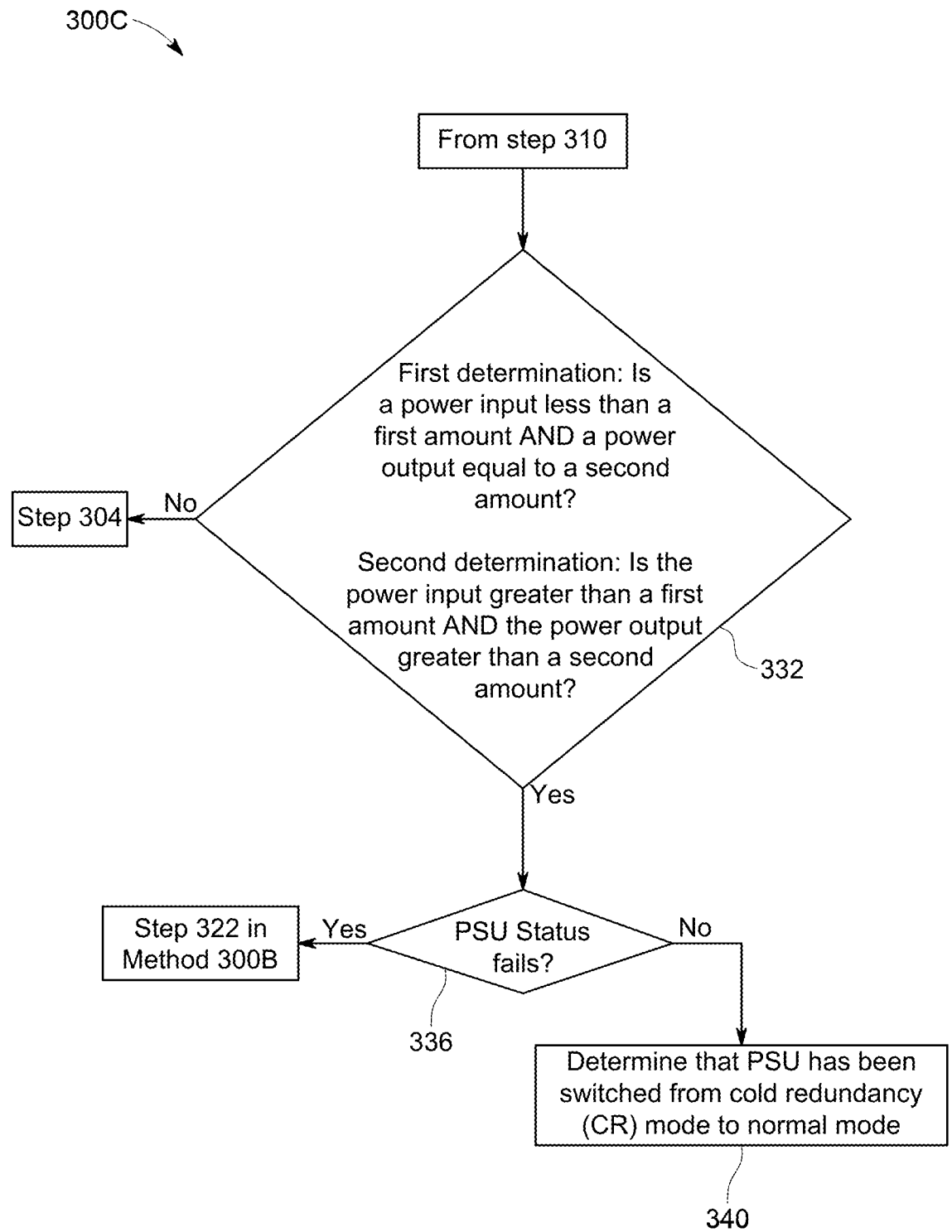
FIG. 3C is a flowchart of the methodology for an exemplary wake-up process according to an embodiment of the present disclosure.

As noted above, method 300C will proceed to step 322 in method 300B of FIG. 3B to perform a software-based recovery process if a failed PSU status is found in step 336. Steps 322, and 324 define the software-based recovery process of FIG. 3B. In the software-based recovery process of method 300B, the PSU is power-cycled to restart it. Because of the reverse airflow discussed earlier, power-cycled PSUs do not always successfully restart because the PSU fan can be too weak to spin in the intended direction. Therefore, the software-based recovery process shown in FIG. 3B can increase the chance that the PSU will restart. This process is described in further detail below.

First, at step 322 of the software-based recovery process, the duty of any system fans can be reduced to a predetermined percentage for a predetermined period of time. Reducing the duty of a system fan reduces the speed with which the system fan rotates, and can thus reduce any problematic reverse airflow current. In some exemplary methods, one can reduce the duty to forty percent for ten seconds. Any other percentage and period of time can be used as well, so long as the combination of the percentage and period of time comprises a sufficient reduction to reduce a reverse airflow current in the computer system. The reduction of the reverse airflow current can be sufficient to allow the PSU fan to begin rotating in the intended direction.

After the reduction in duty at step 322, method 300B proceeds to step 324 of the software-based recovery process. In step 324, a "black-out window" is set which prevents the PSU from sending a "fault" command. For example, the "black-out window" can be a period of time during which the PSU cannot send a failure alert. This allows the method to proceed with restoring the PSU to normal operation without receiving regular alerts that the PSU is not functioning properly yet. For example, the black-out period can be ten seconds long. The black-out period also does not have to start instantly when the system fan duty is reduced in step 322. For example, step 324 can occur after a five second delay from step 322.

The software-based recovery process of 300B can be initiated under other conditions. That is, without requiring execution of method 300C. For example, referring back to FIG. 3A, and step 304 in particular, if two or more PSUs are found not switched onto an AC power source, method 300A will proceed to step 306. In step 306, the computer system can evaluate whether the AC power source for the PSU needs to be power-cycled. If it does not need to be power-cycled, the method then proceeds to the beginning of the method 300A to continue monitoring the status of PSUs in the computer system.

If the AC power source for the PSU does need to be power-cycled, method 300A provides for power-cycling the PSU and then proceeding to the software-based recovery process of method 300B. The software-based recovery process was previously discussed in detail with regards to steps 322, and 324.

All steps of the methods of FIGS. 3A-3C can be completed by a processor configured to complete the steps in a computer system. Steps in the methods discussed with regards to FIGS. 3A-3C can be reordered, omitted, or repeated, in accordance with various embodiments of the present disclosure.

Figure 4:
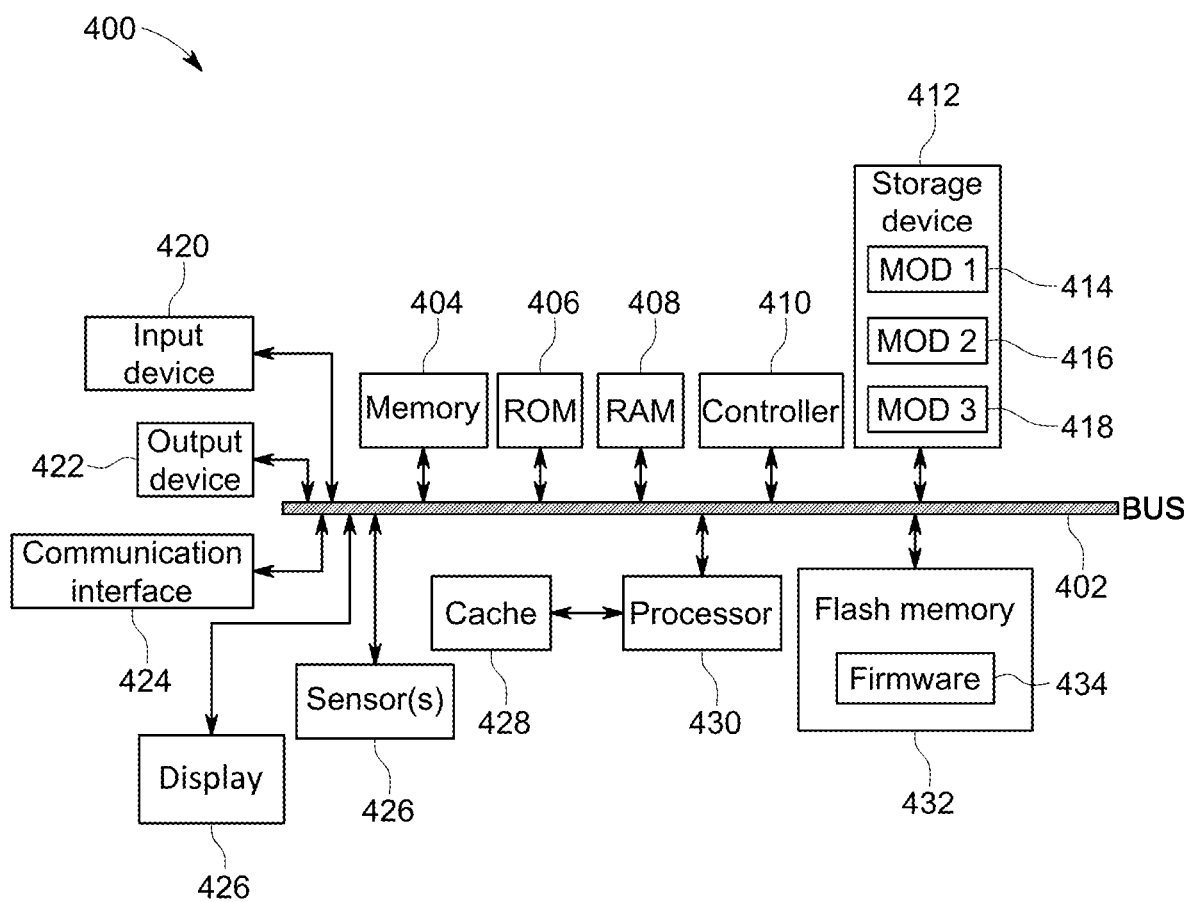
FIGS. 4 and 5 illustrate exemplary systems, in accordance with various examples of the present disclosure.
Figure 5:
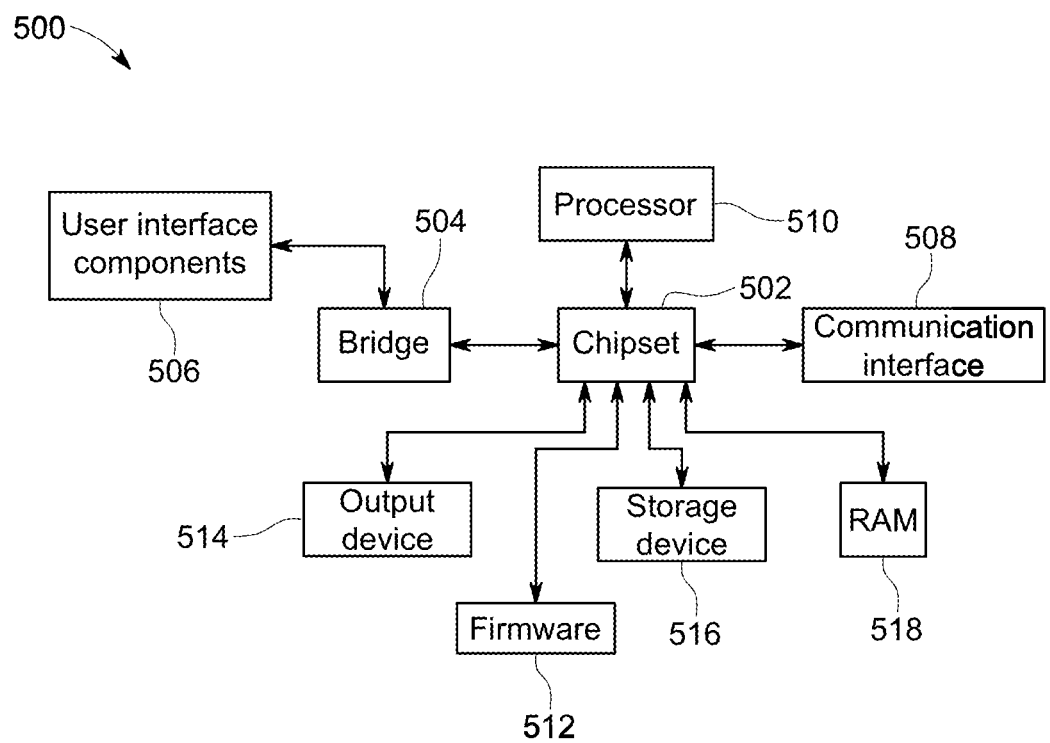

A brief introductory description of example systems and networks, as illustrated in FIGS. 4-5, is disclosed herein. These variations shall be described herein as the various examples are set forth. The present disclosure now turns to FIG. 4.

FIG. 4 illustrates an example computing system 400, in which components of the computing system are in electrical communication with each other using a bus 402. The system 400 includes a processing unit (CPU or processor) 430, and a system bus 402 that couples various system components, including the system memory 404 (e.g., read only memory (ROM) 406 and random access memory (RAM) 408), to the processor 430. The system 400 can include a cache of high-speed memory connected directly with, in close proximity to, or integrated as part of the processor 430. The system 400 can copy data from the memory 404 and/or the storage device 412 to the cache 428 for quick access by the processor 430. In this way, the cache can provide a performance boost for processor 430 while waiting for data. These and other modules can control or be configured to control the processor 430 to perform various actions. Other system memory 404 may be available for use as well. The memory 404 can include multiple different types of memory with different performance characteristics. The processor 430 can include any general purpose processor and a hardware module or software module, such as module 1 414, module 2 416, and module 3 418 embedded in storage device 412. The hardware module or software module is configured to control the processor 430, as well as a special-purpose processor where software instructions are incorporated into the actual processor design. The processor 430 may essentially be a completely self-contained computing system, and containing multiple cores or processors, a bus, memory controller, cache, etc. A multi-core processor may be symmetric or asymmetric.

To enable user interaction with the computing device 400, an input device 420 is provided as an input mechanism. The input device 420 can comprise a microphone for speech, a touch-sensitive screen for gesture or graphical input, keyboard, mouse, motion input, and so forth. In some instances, multimodal systems can enable a user to provide multiple types of input to communicate with the system 400. In this example, an output device 422 is also provided. The communications interface 424 can govern and manage the user input and system output.

Storage device 412 can be a non-volatile memory to store data that are accessible by a computer. The storage device 412 can be magnetic cassettes, flash memory cards, solid state memory devices, digital versatile disks, cartridges, random access memories (RAMs) 408, read only memory (ROM) 406, and hybrids thereof.

The controller 410 can be a specialized microcontroller or processor on the system 400, such as a BMC. In some cases, the controller 410 can be part of an Intelligent Platform Management Interface (IPMI). Moreover, in some cases, the controller 410 can be embedded on a motherboard or main circuit board of the system 400. The controller 410 can manage the interface between system management software and platform hardware. The controller 410 can also communicate with various system devices and components (internal and/or external), such as controllers or peripheral components, as further described below.

The controller 410 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 410 to initiate or conduct specific hardware recovery procedures or operations, as further described below.

The controller 410 can also include a system event log controller and/or storage for managing and maintaining events, alerts, and notifications received by the controller 410. For example, the controller 410 or a system event log controller can receive alerts or notifications from one or more devices and components, and maintain the alerts or notifications in a system event log storage component.

Flash memory 432 can be an electronic non-volatile computer storage medium or chip that can be used by the system 400 for storage and/or data transfer. The flash memory 432 can be electrically erased and/or reprogrammed. Flash memory 432 can include EPROM (erasable programmable read-only memory), EEPROM (electrically erasable programmable read-only memory), ROM, NVRAM, or CMOS (complementary metal-oxide semiconductor), for example. The flash memory 432 can store the firmware 434 executed by the system 400, when the system 400 is first powered on, along with a set of configurations specified for the firmware 434. The flash memory 432 can also store configurations used by the firmware 434.

The firmware 434 can include a Basic Input/Output System or equivalents, such as an EFI (Extensible Firmware Interface) or UEFI (Unified Extensible Firmware Interface). The firmware 434 can be loaded and executed as a sequence program each time the system 400 is started. The firmware 434 can recognize, initialize, and test hardware present in the system 400 based on the set of configurations. The firmware 434 can perform a self-test, such as a POST (Power-on-Self-Test), on the system 400. This self-test can test functionality of various hardware components such as hard disk drives, optical reading devices, cooling devices, memory modules, expansion cards, and the like. The firmware 434 can address and allocate an area in the memory 404, ROM 406, RAM 408, and/or storage device 412, to store an operating system (OS). The firmware 434 can load a boot loader and/or OS, and give control of the system 400 to the OS.

The firmware 434 of the system 400 can include a firmware configuration that defines how the firmware 434 controls various hardware components in the system 400. The firmware configuration can determine the order in which the various hardware components in the system 400 are started. The firmware 434 can provide an interface, such as an UEFI, that allows a variety of different parameters to be set, which can be different from parameters in a firmware default configuration. For example, a user (e.g., an administrator) can use the firmware 434 to specify clock and bus speeds; define what peripherals are attached to the system 400; set monitoring of health (e.g., fan speeds and CPU temperature limits); and/or provide a variety of other parameters that affect overall performance and power usage of the system 400. While firmware 434 is illustrated as being stored in the flash memory 432, one of ordinary skill in the art will readily recognize that the firmware 434 can be stored in other memory components, such as memory 404 or ROM 406.

System 400 can include one or more sensors 426. The one or more sensors 426 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 426 can communicate with the processor, cache 428, flash memory 432, communications interface 424, memory 404, ROM 406, RAM 408, controller 410, and storage device 412, via the bus 402, for example. The one or more sensors 426 can also communicate with other components in the system via one or more different means, such as inter-integrated circuit (I2C), general purpose output (GPO), and the like. Different types of sensors (e.g., sensors 426) on the system 400 can also report to the controller 410 on parameters, such as cooling fan speeds, power status, operating system (OS) status, hardware status, and so forth.

FIG. 5 illustrates an example computer system 500 having a chipset architecture that can be used in executing the described method(s) or operations, and in generating and displaying a graphical user interface (GUI). Computer system 500 can include computer hardware, software, and firmware that can be used to implement the disclosed technology. System 500 can include a processor 510, representative of a variety of physically and/or logically distinct resources capable of executing software, firmware, and hardware configured to perform identified computations. Processor 510 can communicate with a chipset 502 that can control input to and output from processor 510. In this example, chipset 502 outputs information to output device 514, such as a display, and can read and write information to storage device 516, which can include magnetic media, and solid state media, for example. Chipset 502 can also read data from and write data to RAM 518. A bridge 504 for interfacing with a variety of user interface components 506, can be provided for interfacing with chipset 502. Such user interface components 506 can include a keyboard, a microphone, touch detection and processing circuitry, a pointing device, such as a mouse, and so on. In general, inputs to system 500 can come from any of a variety of sources, machine generated and/or human generated.

Chipset 502 can also interface with one or more communication interfaces 508 that can have different physical interfaces. Such communication interfaces can include interfaces for wired and wireless local area networks, for broadband wireless networks, and for personal area networks. Further, the machine can receive inputs from a user via user interface components 506 and execute appropriate functions, such as browsing functions by interpreting these inputs using processor 510.

Moreover, chipset 502 can also communicate with firmware 512, which can be executed by the computer system 500 when powering on. The firmware 512 can recognize, initialize, and test hardware present in the computer system 500 based on a set of firmware configurations. The firmware 512 can perform a self-test, such as a POST, on the system 500. The self-test can test the functionality of the various hardware components 502-518. The firmware 512 can address and allocate an area in the memory 518 to store an OS. The firmware 512 can load a boot loader and/or OS, and give control of the system 500 to the OS. In some cases, the firmware 512 can communicate with the hardware components 502-510 and 514-518. Here, the firmware 512 can communicate with the hardware components 502-510 and 514-518 through the chipset 502, and/or through one or more other components. In some cases, the firmware 512 can communicate directly with the hardware components 502-510 and 514-518.

It can be appreciated that example systems 400 and 500 can have more than one processor (e.g., 430, 510), or be part of a group or cluster of computing devices networked together to provide greater processing capability.

For clarity of explanation, in some instances, the present disclosure may be presented as including individual functional blocks including functional blocks, including devices, device components, steps or routines in a method embodied in software, or combinations of hardware and software.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used, can be accessible over a network. The computer executable instructions may be, for example, binaries and intermediate format instructions, such as assembly language, firmware, or source code.

Devices implementing methods according to these disclosures can include hardware, firmware and/or software, and can take any of a variety of form factors. Typical examples of such form factors include laptops, smart phones, small form factor personal computers, personal digital assistants, rack-mount devices, standalone devices, and so on. Functionality described herein also can be embodied in peripherals or add-in cards. Such functionality can also be implemented on a circuit board among different chips, or different processes executing in a single device, by way of further example.

While various examples of the present invention have been described above, it should be understood that they have been presented by way of example only, and not limitation. Numerous changes to the disclosed examples can be made in accordance with the disclosure herein without departing from the spirit or scope of the invention. Thus, the breadth and scope of the present invention should not be limited by any of the above described examples. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular examples only and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A computer-implemented method for controlling two or more power supply units (PSUs) of a server system, characterized in that the computer-implemented method comprises:
  detecting whether a software-based recovery process is needed for the server system;
  which is comprised of determining whether the two or more PSUs are switched onto an AC power source, whether the two or more PSUs are in an uncoupled state, a failure of at least one fan in the server system, and a temperature in the server system that is greater than a threshold operational temperature; and
  determining that the two or more PSUs are not switched on to the AC power source, restarting the AC power source for the two or more PSUs and performing the software-based recovery process which is comprised of:
    reducing duty of at least one system fan to a predetermined percentage for a predetermined period of time; and
    setting a checkpoint period where the two or more PSUs cannot send a failure alert.

2. The computer-implemented method of claim 1, wherein detecting whether the software-based recovery process is needed further comprises:
  starting a wake-up process for a first PSU from a cold-redundancy mode, wherein the two or more PSUs are coupled together in the cold-redundancy mode.

3. The computer-implemented method of claim 2, wherein starting the wake-up process for the first PSU from the cold-redundancy mode further comprises:
  checking a power change status, wherein the power change status can include either:
    when a power input to the first PSU is less than a first amount and when a power output of the first PSU is equal to a second amount; or
    when a power input to the first PSU is greater than a first amount and when a power output of the first PSU is greater than a second amount.

4. The computer-implemented method of claim 3, wherein starting the wake-up process for the first PSU from the cold-redundancy mode further comprises determining that the first PSU has failed.

5. The computer-implemented method of claim 3, wherein starting the wake-up process for the first PSU from the cold-redundancy mode further comprises:
  determining that the first PSU has not failed;
  detecting that the software-based recovery process is not needed; and
  in response to detecting that the software-based recovery process is not needed, proceeding to a normal operating mode for the two or more PSUs.

6. The computer-implemented method of claim 5, wherein the first amount is twenty-five watts.

7. The computer-implemented method of claim 5, wherein the second amount is zero watts.

8. The computer-implemented method of claim 1, comprising:
  detecting that the software-based recovery process is not needed; and
  in response to detecting that the software-based recovery process is not needed, disabling a cold-redundancy mode of the two or more PSUs, wherein the two or more PSUs are coupled together in the cold-redundancy mode.

9. The computer-implemented method of claim 1, wherein the predetermined period of time is ten seconds.

10. The computer-implemented method of claim 1, wherein the checkpoint period is ten seconds.

11. The computer-implemented method of claim 1, wherein the predetermined percentage is forty percent.

* * * * *